No. 757,728. PATENTED APR. 19, 1904.
S. ELLIOTT.
APPARATUS FOR FOLDING AND WRAPPING PAMPHLETS.
APPLICATION FILED NOV. 6, 1902.
NO MODEL. 9 SHEETS—SHEET 6.

Witnesses:

Inventor:
Sterling Elliott,
by ____ Attys.

No. 757,728. PATENTED APR. 19, 1904.
S. ELLIOTT.
APPARATUS FOR FOLDING AND WRAPPING PAMPHLETS.
APPLICATION FILED NOV. 6, 1902.
NO MODEL. 9 SHEETS—SHEET 7.

Witnesses:

Inventor:
Sterling Elliott,
by ______
Attys.

No. 757,728. PATENTED APR. 19, 1904.
S. ELLIOTT.
APPARATUS FOR FOLDING AND WRAPPING PAMPHLETS.
APPLICATION FILED NOV. 6, 1902.
NO MODEL. 9 SHEETS—SHEET 8.

Witnesses:

Inventor:
Sterling Elliott,
by Foster Freeman
Attys.

No. 757,728. PATENTED APR. 19, 1904.
S. ELLIOTT.
APPARATUS FOR FOLDING AND WRAPPING PAMPHLETS.
APPLICATION FILED NOV. 6, 1902.
NO MODEL. 9 SHEETS—SHEET 9.

No. 757,728. Patented April 19, 1904.

UNITED STATES PATENT OFFICE.

STERLING ELLIOTT, OF BOSTON, MASSACHUSETTS, ASSIGNOR TO THE ELLIOTT COMPANY, OF BOSTON, MASSACHUSETTS, A CORPORATION OF MAINE.

APPARATUS FOR FOLDING AND WRAPPING PAMPHLETS.

SPECIFICATION forming part of Letters Patent No. 757,728, dated April 19, 1904.

Application filed November 6, 1902. Serial No. 130,302. (No model.)

*To all whom it may concern:*

Be it known that I, STERLING ELLIOTT, a citizen of the United States, residing at Boston, in the county of Suffolk and State of Massachusetts, have invented certain new and useful Improvements in Apparatus for Folding and Wrapping Pamphlets, of which the following is a specification.

My invention relates to that class of apparatus for folding and wrapping pamphlets and other articles set forth in Letters Patent to me No. 696,021; and my invention consists of certain improvements in certain parts of the said apparatus, as fully set forth hereinafter and as illustrated in the accompanying drawings, in which—

Before describing the details of the improved apparatus I will refer to the diagrams Figs. 16 to 21, which illustrate the main operations to be performed, first, upon a paper, pamphlet, or other matter $x$ to be wrapped and pasted, and, secondly, upon the wrapper in applying the same to the pamphlet and folding them together in such manner as to leave a standing edge to the wrapper, applying paste to the wrapper, and then folding down this edge.

The pamphlet or other paper $x$ is presented to two rolls $e$ $e$ by a blade $d$, which bends the paper and forces it between the rolls, which fold and carry it onto a table $f$. The folded paper is then moved along the table $f$ by a pusher, which carries it onto a blade 7, that enters the fold of the paper, and while the latter is in this position (see Fig. 17) the wrapper-sheet $y$ is placed above the paper $x$, after which the blade 7 (swinging about the center of a shaft $m$) moves to the vertical position shown in Fig. 18, when a blade $n$ is turned to the position shown in dotted lines, Fig. 18, to fold one edge of the wrapper over the folded edge of the paper and another blade, 16, bends the paper and wrapper in the center between two folding and feed rolls 37 37, which carry the folded and partially-wrapped paper forward in the direction of the arrow, Fig. 19, the blades 7 and 16 remaining in the folds of the article and being then turned to the vertical position shown in Fig. 20. The article is now seized between the blades 7 and 16 by means of jaws $p$ $p$, which carry the article longitudinally off the blades to a position opposite a paster, which applies paste to the wrapper at the point $v$, Fig. 20, after which the standing edge is turned down over the pasted portion and pressed against the latter until it adheres thereto. The wrapped and folded paper is then carried farther to a position opposite a chute, and the jaws then release the same.

I will not attempt to describe in detail the apparatus which performs these operations, but will refer only to those features which are changes of or improvements upon those described in my aforesaid Letters Patent, the figures and letters of reference in the accompanying drawings being the same where they refer to corresponding parts as those in the drawings of the said Letters Patent, while the parts connected with my improvement all bear numbers in excess of the number 120.

The platform or table 121, upon which the pamphlets or other papers to be wrapped are placed, has at the end nearest the inclined plate $a$ two feed-rolls 122 122 upon two parallel shafts 123 123, to which motion in the direction of their arrows is imparted by driving-belts or otherwise. The upper shaft 123 is carried in a swinging frame 124, to which vibrating motion is imparted from any suitable part of the machine, so that the rolls 122 are separated to receive between them the paper to be folded and are then brought together to grip and feed the same, so that one paper must pass from the feed-rolls before another can be gripped and taken.

A stop-pin 200, connected with the frame 124, rises above the table 121 when the frame is lifted, so as to act as a gage, which enables the feeder to place the paper so as to have it properly located for the feed-rolls to take it.

Figure 1:
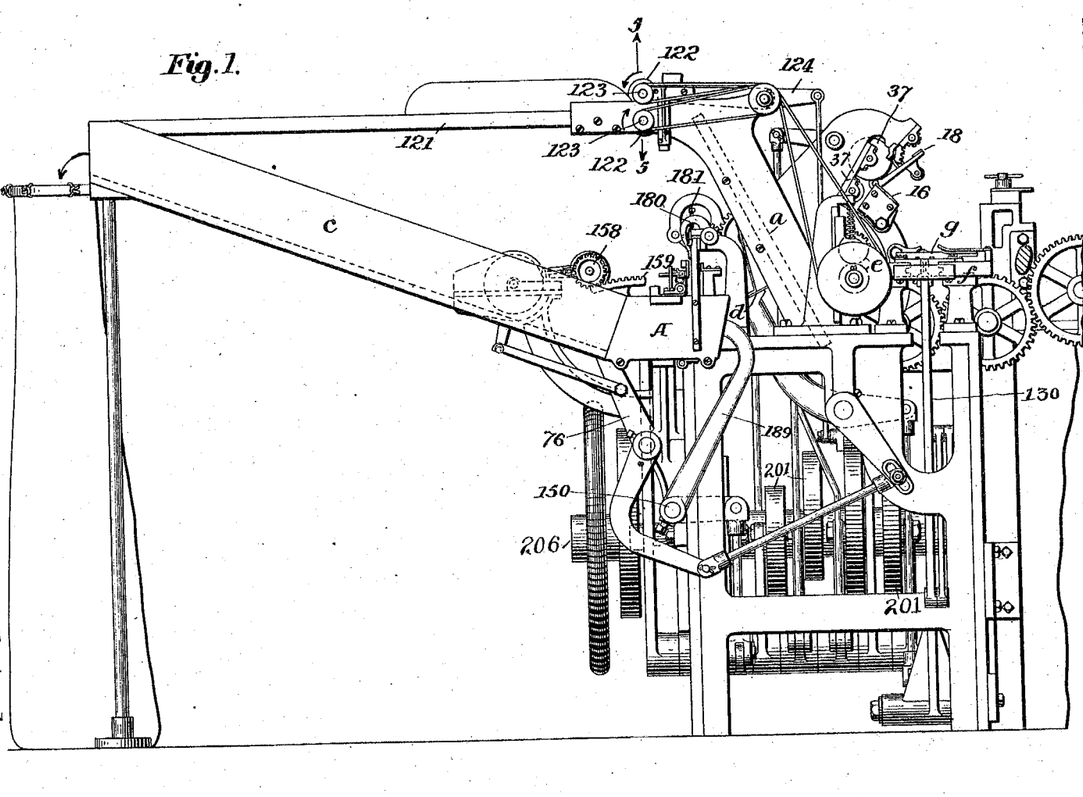
Figure 1 is an elevation of one side, and Fig. 2 an elevation of the opposite side, of said apparatus.
Figure 3:
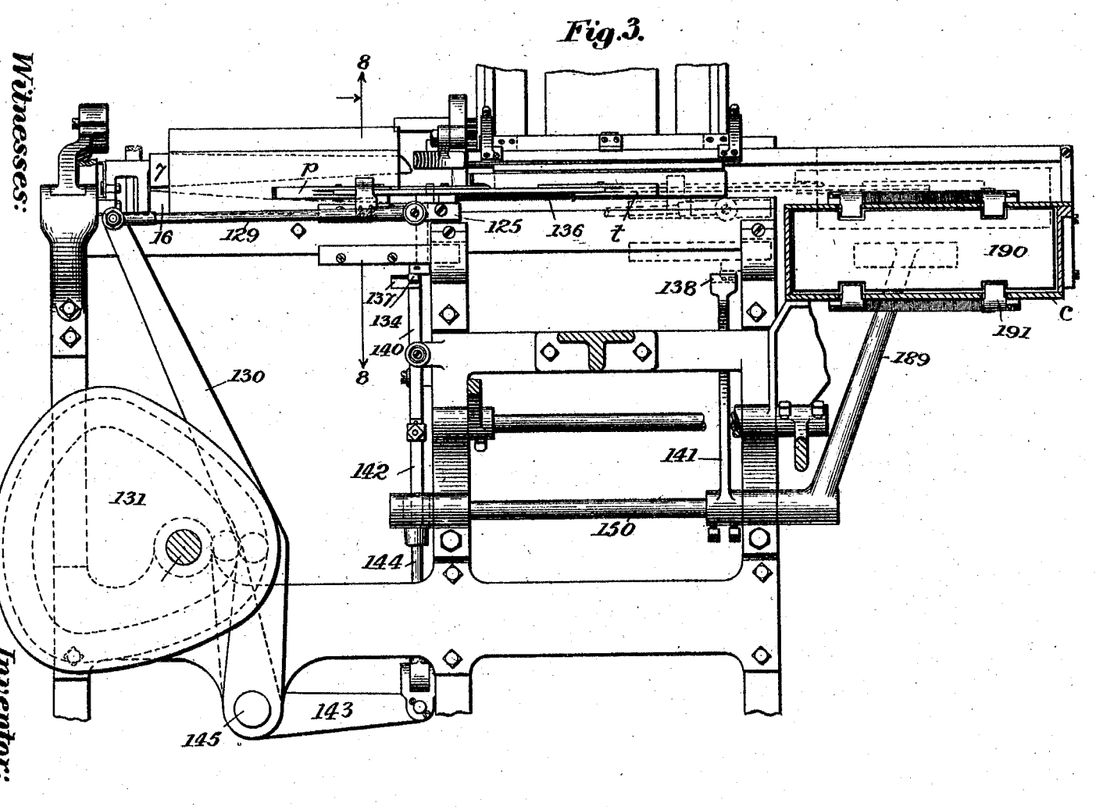
Fig. 3 is a part sectional elevation on the line 3 3, Fig. 2.
Figure 4:
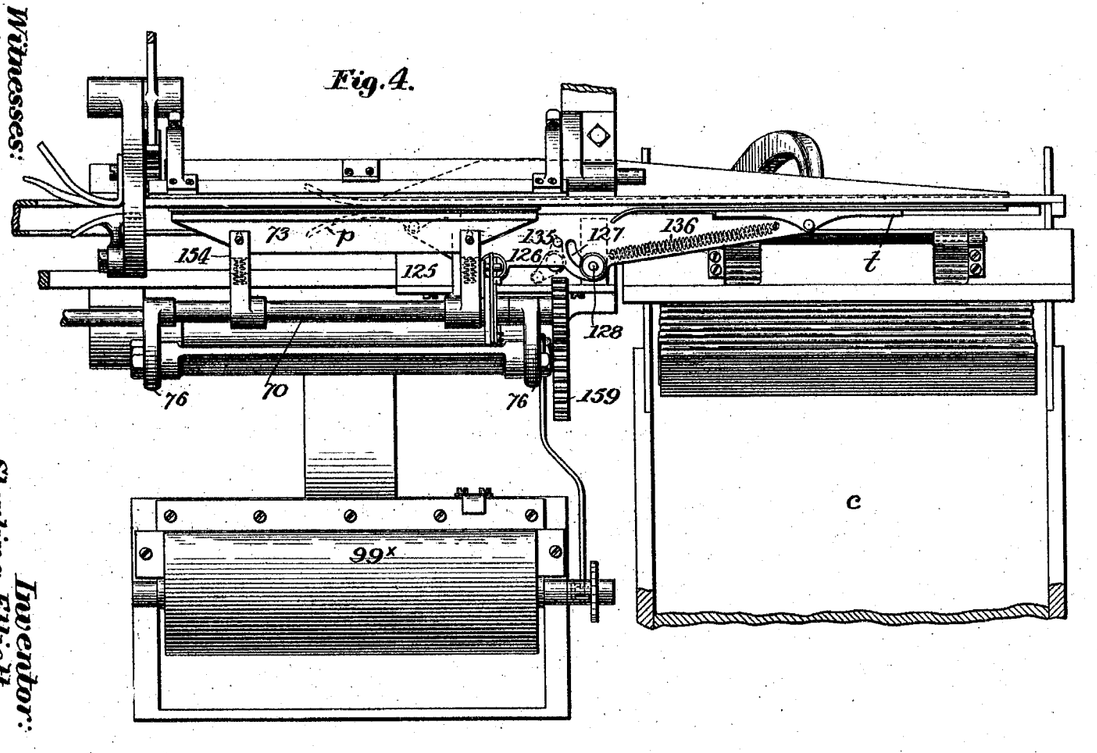
Fig. 4 is a part sectional plan.
Figure 5:
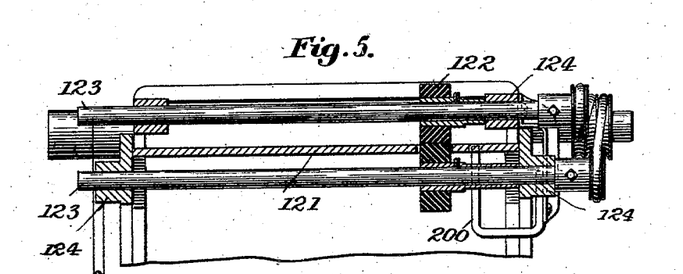
Fig. 5 is an enlarged section on the line 5 5, Fig. 1.

The paper on the plate a, Fig. 1, is carried by the blade d between the rolls e (shown in dotted lines) and passes to the table f, where it is pushed by the pusher g to a position upon the blade 7, and after the operations before described the blades 7 and 16 are brought to the vertical position shown in Fig. 3, so that the partially-wrapped paper may be seized by the jaws p p.

Figures 8, 9, 10:
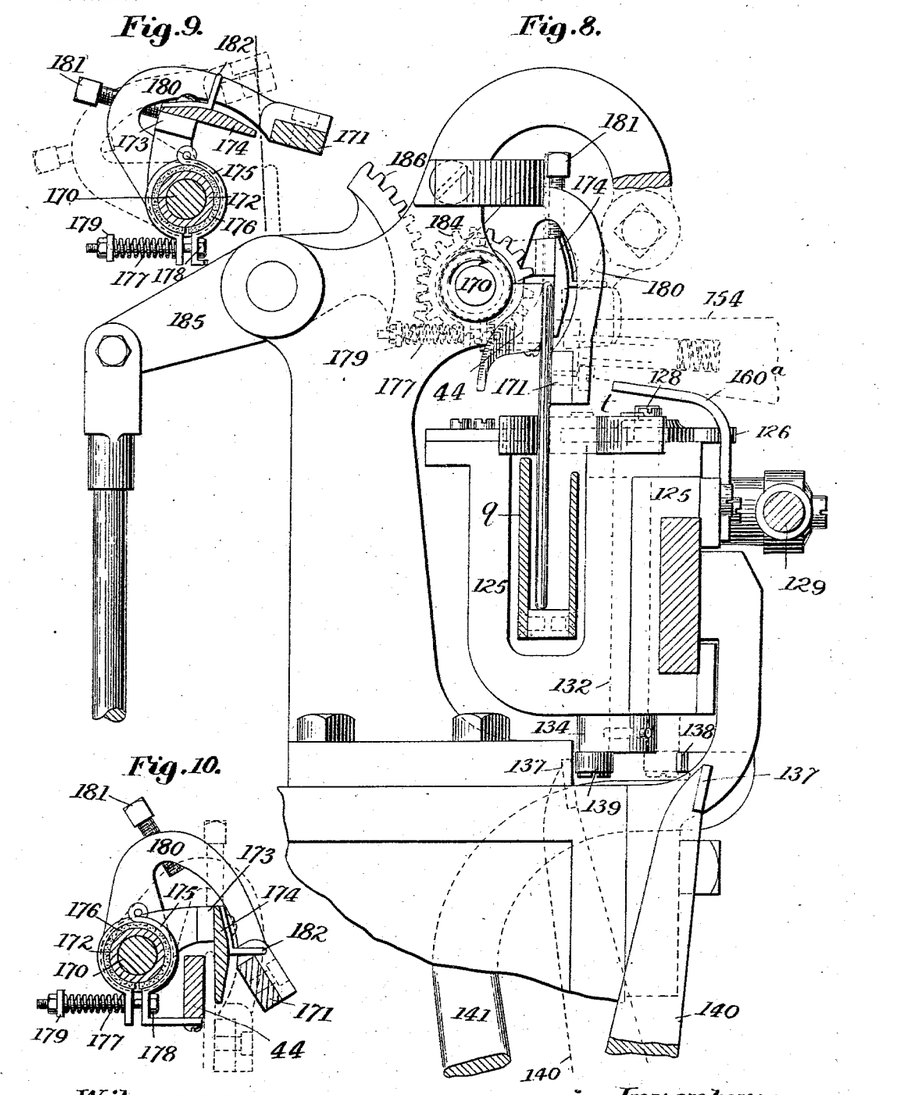
Fig. 8 is an enlarged section of parts on the line 8 8, Fig. 3.
Figs. 9 and 10 are sectional views illustrating different positions of the flap-folding devices.
Figure 11:
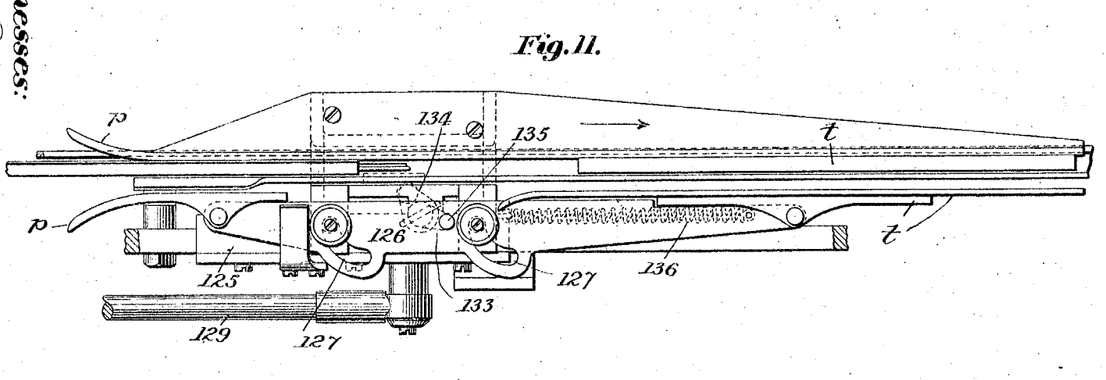
Fig. 11 is a plan view of the gripper device for carrying the folded article.
Figure 12:
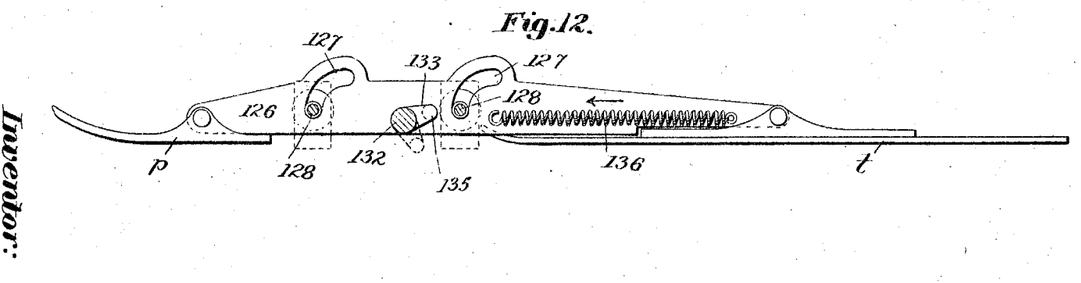
Fig. 12 is an inverted plan of the movable jaw.

The jaws p p, as well as the jaws t t, are differently constructed from the construction of said Letters Patent, the inner jaws being secured to a reciprocating slide 125, Fig. 8, and being immovable thereon, while the outer jaws in the form of shoes (best shown in Figs. 11 and 12) are pivoted to a plate 126, having curved slots 127 127, through each of which extends a pin 128, carried by the slide. The slide 125 is connected by a rod 129 with the lever 130, reciprocated by a cam 131, and a shaft 132 extends vertically through the slide and has at the upper end a crank-arm 133 and at the lower end a crank-arm 134. The pin 135 of the crank-arm 133 extends through a hole in the plate 126, and the parts are so proportioned that the swinging of the crank-arm 133 to the two positions (shown in full and dotted lines, Fig. 12) will carry the plate 126, with its jaws, to and from the fixed jaw carried by the slide, the said plate 126 being guided by the pins 128. A spring 136 is connected at one end to the slide and at the other to the plate 126 and tends to draw the plate in the direction of the arrow, Fig. 12, and as the crank 133 in either extreme position is either forward or back of the axis of the shaft 132 the force exerted by the spring tends to hold the crank in such position, and thus to hold the movable jaws either open or shut, the movable jaws being in their gripping position when the crank is in the position shown in dotted lines, Fig. 12.

When the folded paper is upon the blades 7 16, Fig. 3, it is gripped by the jaws p p. The latter then move in the direction of their arrow, Fig. 11, and carry the paper opposite the paster. The jaws then open, and the slide 125 then moves in the direction the reverse of the arrow, Fig. 11, and the jaws p p are brought to clamp another partially folded and wrapped paper, while the jaws t t grip the article which has been folded and pasted, and on the next movement in the direction of the arrow, Fig. 11, the folded and pasted article is carried by the jaws t t to a position at the bottom of the chute c. The jaws t t then release the said article, and the slide moves back to its first position.

By making the outer jaws in the form of pivoted shoes, as shown, they will accommodate themselves to the face of the folded article and grip the same firmly without danger of indenting or wounding the same, and by making the opposite jaws stationary upon the slide the articles are successively presented in uniform positions to the pasting devices.

Figure 6:
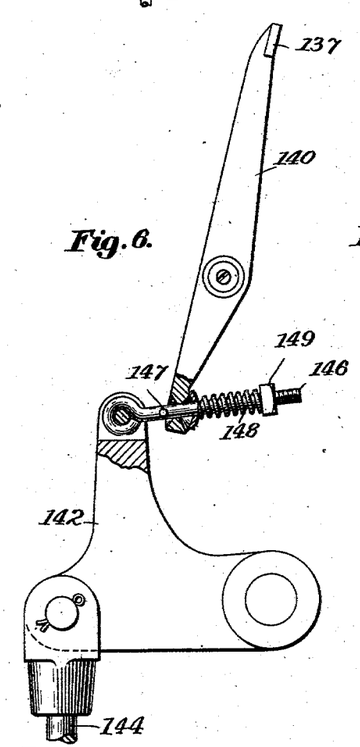
Figs. 6 and 7 are details of devices for operating the clamps.
Figure 7:
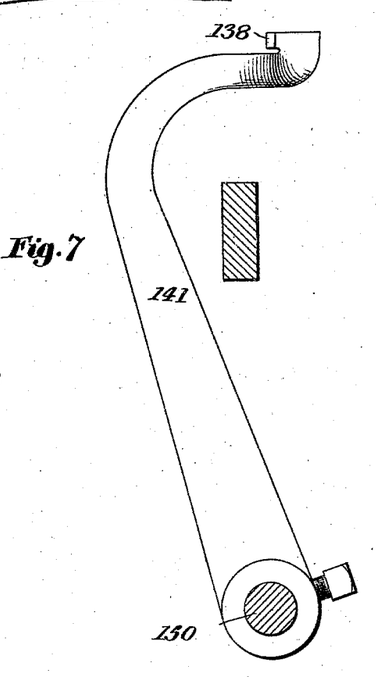

The proper operation of the movable jaws at proper times is imparted by swinging the crank-arm 134 from its extreme position across the plane of the axis of the shaft 132, after which the spring 136 will carry it to its other extreme position. The movements of the crank-arm 134 are effected by means of two pressure-blades 137 and 138, (best shown in Figs. 6, 7, and 8,) the said blades making contact with an antifriction-roller 139, carried by the crank-arm. The blade 137 is carried by a lever 140 and the blade 138 by an arm 141.

The lever 140 is swung about its pivot by the reciprocation of a bell-crank lever 142, which has a positive motion imparted by a connecting-rod 144 from an arm 143 on the shaft 145 of the lever 130, Fig. 3. It is not desirable, however, to impart a positive movement to the blade 137, as the pamphlets or other matters vary in thickness, and I therefore provide a yielding connection at some point between the blade 137 and its operating devices. As shown, there is a connecting-rod 146, pivoted to one arm of the bell-crank lever 142, passing through an opening at the lower end of the lever 140, provided with a pin 147, bearing against the lever 140 in one direction and carrying a coiled spring 148, which bears on the opposite edge of the lever 140 and which will yield if the thickness of the pamphlet or other matter prevents the blade 137 from being carried outward as far as usual. A nut 149 turns on the threaded end of the rod 146 and serves to vary the tension of the spring. The arm 141 is carried by rock-shaft 150.

The pasting devices transfer the paste from a paste-roller 99 and differ from those of the aforesaid Letters Patent.

Figure 14:
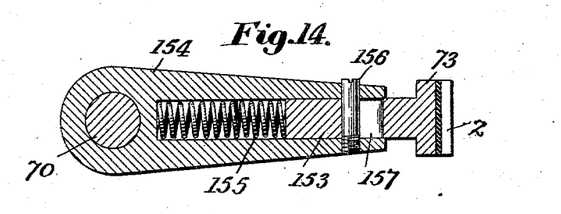
Fig. 14 is a section of the paster-head.
Figure 15:
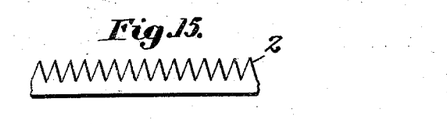
Fig. 15 is a plan of the paster-strip.
Figure 16:
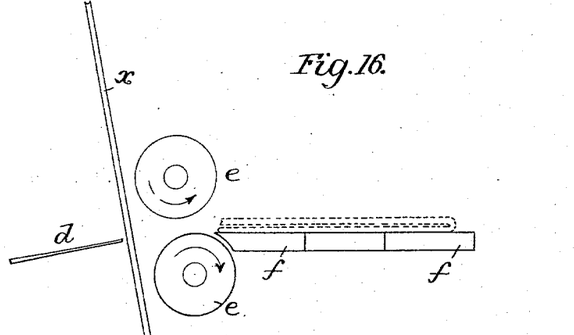
Figs. 16 to 21 are diagrams illustrating the operations of the apparatus.
Figures 17, 18, 19, 20, 21:
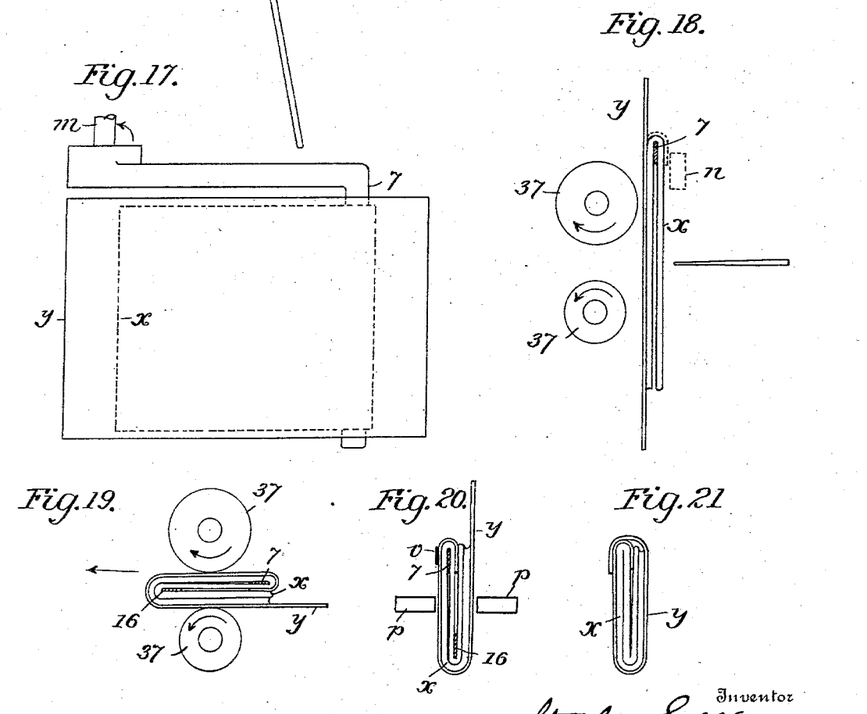

There is a single paster-head mounted upon a shaft 70, carried by swinging arms 76 and carrying a paster-strip 73, which is presented alternately to the roller 99× and to the side of the wrapper. Preferably the paster-strip is a strip of felt, rubber, or other material, which instead of having a continuous surface has a series of projections z, which may be in the form of ribs or pins, so that the paste is applied in spots instead of continuously, and when the edge of the wrapper is folded down upon the pasted portion there is room between the spots for the paste to spread. This permits the paste to be spread out in a thinner layer, so that it will dry quickly, and also prevents it from being forced from beneath the turned-down flap, which is apt to result when the continuous line of paste is applied, causing the different folded and wrapped articles to stick together. The requisite yielding action of the paster-head is secured by providing it with a tongue 153, Fig. 14, extending into channels of the arms 154 and bearing against springs 155, pins 156 extending through slots 157 and limiting the yielding movement of the paster-head.

The swinging action of the paster-head is effected by the rotation of a pinion 158, carried by the shaft 70, traveling upon a segmental fixed rack 159, supported by arms 160, bolted to the frame of the machine.

Figure 2:
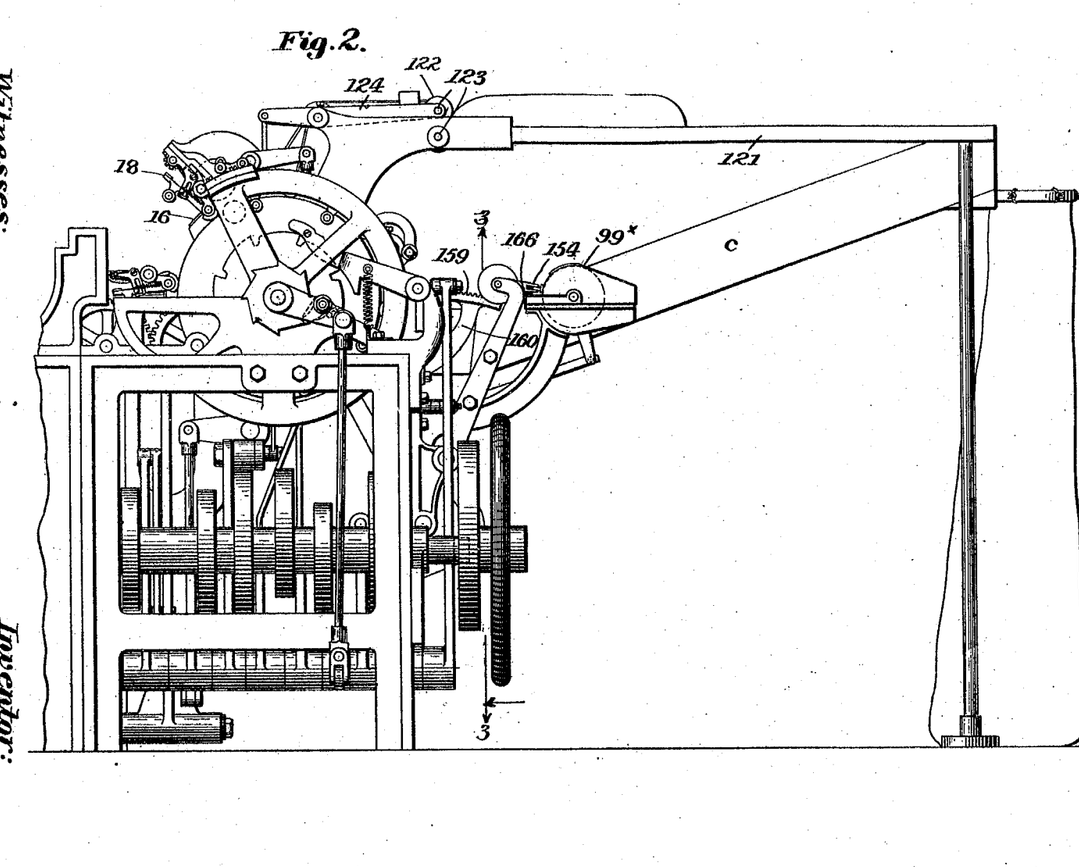
Figure 13:
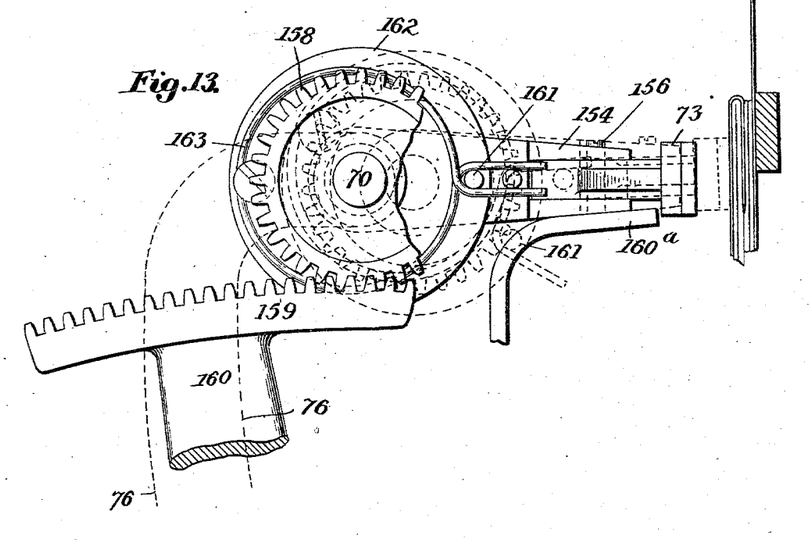
Fig. 13 is a detached view of the paster-head and adjuncts.

It is of course important to prevent the paster-strip from swinging in an arc at the time it is presented to the wrapper. In other words, it should be carried to and from the latter in a path perpendicular thereto. To secure this result, the arms 154 after they have been swung to bring the paster-head opposite the wrapper strike a bracket 160ª, Figs. 8 and 13, which prevents a further swinging movement, and the head then moves forward until the paster-strip is in contact with the wrapper. As this forward motion of the head after the arms are arrested results in a further rotation of the pinion 158, traveling on the rack 159, I provide a yielding connection between the pinion and its shaft, on which the pinion can turn freely. Thus the pinion 158 carries a lug 161, and on the shaft 70 is secured a disk 162, to which is centrally connected a bent spring 163, having parallel arms, between which the lug 161 extends, so that normally the shaft is turned with the pinion. When, however, the arms 154 strike the bracket 160, the further rotation of the shaft and disk is prevented; but the rotation of the pinion continues, carrying the lug 161 and bending down one end of the spring to the position shown in dotted lines, Fig. 13. The same result is secured in applying the paster to the paste-wheel 99ˣ, the arms 154 striking a bracket 166, Fig. 2, thus arresting the swinging of the arms, while the other end of the spring yields under the action of the lug 161.

The devices for folding over the standing edge of the wrapper after the application of the paste are best shown in Figs. 1, 8, 9, and 10. It is desirable to hold the folded and wrapped paper with the jaws p p until the flap of the wrapper is folded down onto the pasted part. Then only the folding-down bar or presser-blade 171 rises, leaving the blade 174 to hold the folded flap while the jaws t t come back to grip the finished product, and the blade 174 does not rise until the jaws t t have taken hold. Thus there is no time when the pasted flap could "let go" until the instant it drops into the chute.

In a suitable bracket turns a shaft 170, carrying bent arms 180, supporting a presser-blade 171, and on the shaft 170 is a sleeve 172, having arms 173, carrying a blade 174. On the sleeve 172 there is a frictional connection secured by a clamp 175 and leather shoe 176 and spring 177, bearing at one end upon a lip of the clamp and at the other upon a nut 179, carried by a bolt 178, extending through said lip and bearing with its head upon the other lip of the clamp. This friction-clamp is attached to the stationary bar 44 and tends to hold the sleeve 172 against revolving in either direction, so that its motion is with the shaft 170, except that it stands still during a part of the revolution, being moved down by the set-screw 181 and up by the bar 171 striking the bracket 182.

When the shaft 170 is rocked in the direction of its arrow, Fig. 8, the blade 171 will strike the standing edge or flap of the wrapper occupying the position shown in dotted lines, Fig. 9, and will carry the same over and down onto the pasted part of the wrapper to the position shown in Fig. 8, the bolt 181 striking the rear edge of the blade 174 and carrying the latter to the position shown in Fig. 8 to also firmly grip the folded-down flap and hold the package firmly against the bearing-plate 44.

When the rotation of the shaft 170 is reversed, the blade 171 will swing out of the way of the gripper, and the blade 174 will continue to grip the package until the edge of the blade 171 strikes the lug 182, when both blades will be carried back and out of position, so that the next folded paper, with the edge of the wrapper standing, can be carried into place.

The shaft 170 is rocked through the medium of a pinion 184 and rack 186, carried by a lever 185.

The wrapped and pasted article carried by the jaws t t opposite the end of the chute c is forced into the latter by the end of a rock-arm 189, carrying a blade 190, Fig. 3, which is notched for the passage of the usual spring retaining-fingers 191, which yield as the wrapped article is forced inward, and then spring back into position to resist the downward movement of the mass of articles in the trough.

While the movements of the various parts may be imparted in different ways, I have shown a shaft 206, Fig. 1, on which are arranged cams 201, that impart proper movements at proper times to parts connected with the various devices to be moved thereby.

Without limiting myself to the precise construction and arrangement of parts shown, I claim as my invention—

1. The combination with the devices for folding the article and applying the wrapper and folding the two together, of a reciprocating slide carrying two pairs of jaws, one jaw of each pair being fixed on the slide and the other movable to and from the fixed jaw, substantially as set forth.

2. The combination with the reciprocating slide and its fixed jaws, of a movable plate carrying jaws each in the form of a pivoted shoe, substantially as set forth.

3. The combination with the reciprocating slide and its fixed jaws, of a plate carrying movable jaws and provided with curved guide-slots, pins extending from the slide into said slots, and means for moving said plate, substantially as set forth.

4. The combination of the reciprocating slide, its fixed jaws, movable plate-carrying jaws, a crank-shaft extending through the slide with its crank-pin fitting an opening in the plate, and means for rocking the crank-shaft, substantially as set forth.

5. The combination with the reciprocating slide, its fixed and movable jaws and operating crank-shaft, of a spring connected to hold the crank-shaft and plate in both extreme positions, substantially as set forth.

6. The combination with the reciprocating slide, fixed and movable jaws, and crank-shaft, of blades 137, 138, and means for bringing them alternately to operate upon the crank-shaft, substantially as set forth.

7. The combination with the reciprocating slide, fixed and movable jaws, crank-shaft, and blades 137 and 138, of means for swinging the said blades and a yielding connection between the blade 137 and its operating devices, substantially as set forth.

8. The combination with the folding and wrapping devices, of a paste-roll, a paster-head, a shaft carrying the same, means for rocking the shaft to carry the head to positions opposite the paste-roll and article to be pasted, and means for sliding the head away from the shaft after it is brought opposite the article, substantially as set forth.

9. The combination with the paster-head and rock-shaft supporting the same, of a pinion turning on said shaft, a yielding connection between the said pinion and the shaft, and means for turning the said pinion and for carrying the shaft back and forth, substantially as set forth.

10. The combination of the paster-head, rock-shaft, and supporting-arms, and bearings for limiting the rocking motion of the head, a rack and pinion for swinging the head, and spring connections between the pinion and the shaft, substantially as set forth.

11. The combination of the paster-head, shaft, supporting-arms, and stationary rack, and a pinion turning on the shaft and engaging the rack and carrying a pin and a bent spring connected with the shaft and having arms engaging the opposite sides of the pin, substantially as set forth.

12. The combination with the devices for bringing together and folding the article and the wrapper to present a standing edge of the wrapper, of two folder-blades 171, 174, a shaft carrying the same, and means for permitting a limited movement of the outer blade independently of the inner one, substantially as set forth.

13. The combination of the rock-shaft 170, bent arms and a blade 171 carried thereby, a sleeve on said shaft with arms carrying a blade 174, and a frictional connection for limiting the movement of one blade in respect to the other, substantially as set forth.

In testimony whereof I have signed my name to this specification in the presence of two subscribing witnesses.

STERLING ELLIOTT.

Witnesses:
E. L. BENSON,
H. S. DIX.